(12) United States Patent
Otsuka (10) Patent No.: US 6,511,300 B2
(45) Date of Patent: Jan. 28, 2003

(54) IMPELLER FOR AXIAL FLOW TYPE BLOWER

(75) Inventor: Shuichi Otsuka, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 27 days.

(21) Appl. No.: 09/918,471

(22) Filed: Aug. 1, 2001

(65) Prior Publication Data

US 2002/0028146 A1 Mar. 7, 2002

(30) Foreign Application Priority Data

Sep. 1, 2000 (JP) ........................................ 2000-265665

(51) Int. Cl.[7] .......................... F04B 17/00; F04B 35/04
(52) U.S. Cl. ........................................ 417/354; 432/199
(58) Field of Search ................................. 417/354, 220, 417/423.1, 423.7, 423.14; 310/88, 67 R; 392/385; 416/203; 432/199; 261/89

(56) References Cited

U.S. PATENT DOCUMENTS

| | | | | |
|---|---|---|---|---|
| 4,219,325 A | * | 8/1980 | Gutzwiller | 432/199 |
| 4,474,534 A | * | 10/1984 | Thode | 416/203 |
| 5,135,363 A | * | 8/1992 | Harmsen et al. | 417/354 |
| 5,702,646 A | * | 12/1997 | Braendli | 261/89 |
| 6,011,903 A | * | 1/2000 | Nosenchuck | 392/385 |
| 6,132,182 A | * | 10/2000 | Khan et al. | 417/354 |
| 6,137,197 A | * | 10/2000 | Taniguchi et al. | 310/67 R |
| RE37,261 E | * | 7/2001 | Schmider et al. | 417/423.7 |
| 6,278,207 B1 | * | 8/2001 | Matsumoto | 310/88 |
| 6,296,459 B1 | * | 10/2001 | Saputo et al. | 417/423.14 |
| 6,379,126 B1 | * | 4/2002 | Konno | 417/423.1 |
| 2001/0006598 A1 | * | 7/2001 | Tsuchiya | 417/220 |

* cited by examiner

Primary Examiner—Teresa Walberg
Assistant Examiner—Leonid Fastovsky
(74) Attorney, Agent, or Firm—Oliff & Berridge, PLC (57) ABSTRACT

An impeller arrangement in which adjacent blades (ventilating surfaces) are overlapped with each other as viewed in the axial direction is realized easily and cost-effectively even in a synthetic-resin-molded product. In an impeller for an axial flow type blower driven by an outer rotor type motor which is integrated to a rotatably supported shaft and a motor yoke to be rotated about the shaft around an outer side of a stator together with the motor yoke for ventilation, the impeller comprises a plurality of impellers (divided impellers, for example, a front side divided impeller and a rear side divided wheel), so that each of the divided impellers can be molded by a simple molding method using axially coupled type metal dies. By disposing the divided impellers in series, and setting suitable angular relation between the front side divided blade and the rear side divided blade about the axis in the disposing procedure of the divided impellers, the impeller obtained as a whole is arranged such that adjacent ventilating surfaces are overlapped with each other as viewed in the axial direction.

3 Claims, 10 Drawing Sheets

IMPELLER FOR AXIAL FLOW TYPE BLOWER

BACKGROUND OF THE INVENTION

1. Field of the Invention

The present invention relates to an improvement for an impeller of an axial flow type blower to be used in various OA (office automation) equipment, etc.

2. Description of the Related Art

Various OA equipment, such as a computer and a copy machine, are designed to accommodate a large number of electronic parts in a housing, so that the heat generated therefrom is large and may thermally damage the electronic parts. For this reason, an axial flow type blower is mounted to a ventilation hole provided to the equipment housing to release the internal heat out of the equipment.

Figure 9:
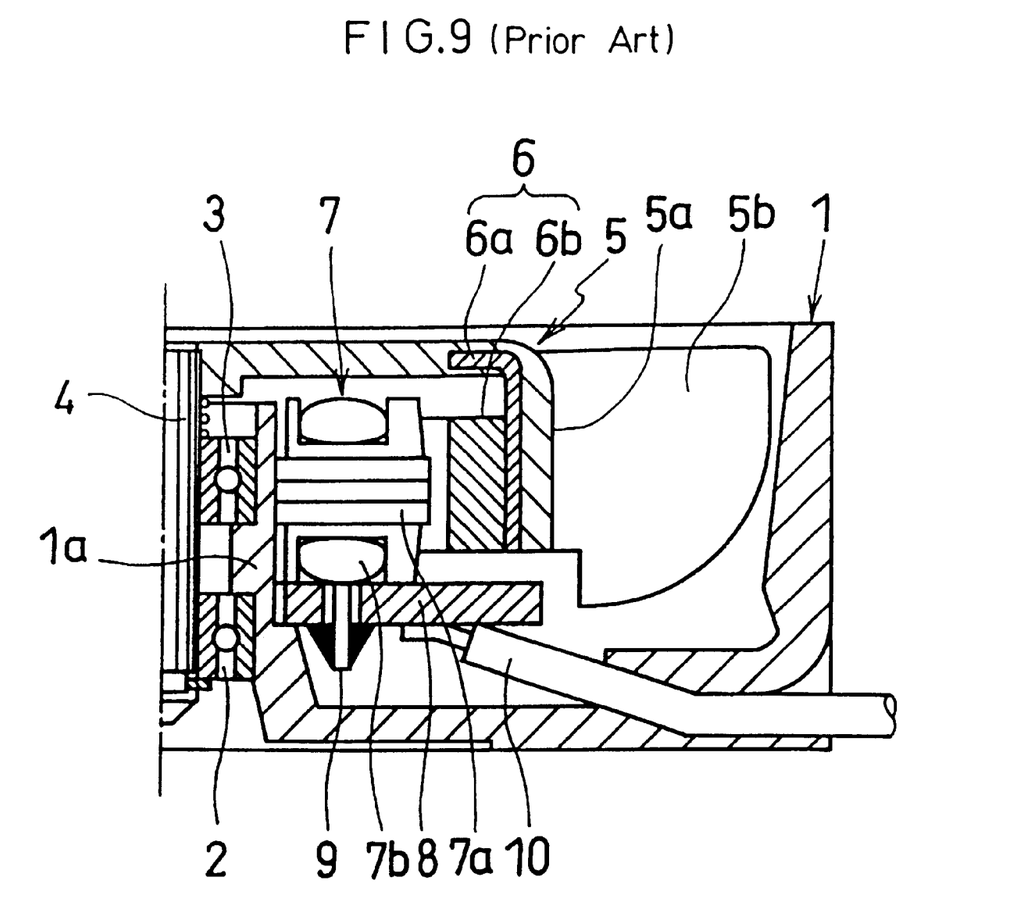
FIG. 9 is a partially omitted, sectional view of a conventional blower.

A typical blower of this type will be described by taking as an example an axial flow type blower driven by an outer rotor type motor with reference to FIG. 9.

As illustrated, a shaft 4 is inserted into and rotatably supported by a central tubular portion 1a of a casing 1 through bearings 2 and 3.

This shaft 4 is attached to a central portion of an impeller 5 (a central portion of a cup portion 5a) that is made up of the cup portion 5a (a tubular portion having a bottom) and a plurality of blades 5b on the outer periphery thereof.

A motor yoke 6a is molded to an inner periphery of the cup portion 5a, and a ring-like permanent magnet 6b is fixed to the inner periphery of the motor yoke 6a. This permanent magnet 6b forms, in cooperation with the motor yoke 6a, a major construction of a rotor (an outer rotor) 6.

A stator 7 is fixed to an outer side of the tubular portion 1a, which has a stator core 7a and a stator coil 7b that are confronted with the permanent magnet 6b. A PC board 8 is attached to a lower portion of the stator 7, and electric circuits are mounted on the PC board 8 to supply a prescribed electric current to the stator coil 7b and to allow the stator 7 and the rotor 6 to serve as a stator and a rotor of a brush-less DC motor, respectively.

The stator coil 7b and the electric circuits on the PC board 8 are connected to each other through a pin 9. A lead wire 10 is connected to the PC board 8.

In the blower constructed as mentioned above, when a prescribed DC voltage of a power source is applied to the lead wire 10, a current controlled by the electric circuits on the PC board 8 is allowed to flow through the stator coil 7b. This generates magnetic flux flow from the stator core 7a to rotate the rotor 6 about the shaft 4 through mutual magnetic effect with respect to magnetic flux flow of the permanent magnet 6b, thereby making the impeller 5 integral with the motor yoke 6a of the rotor 6 rotate for ventilation.

Figure 10:
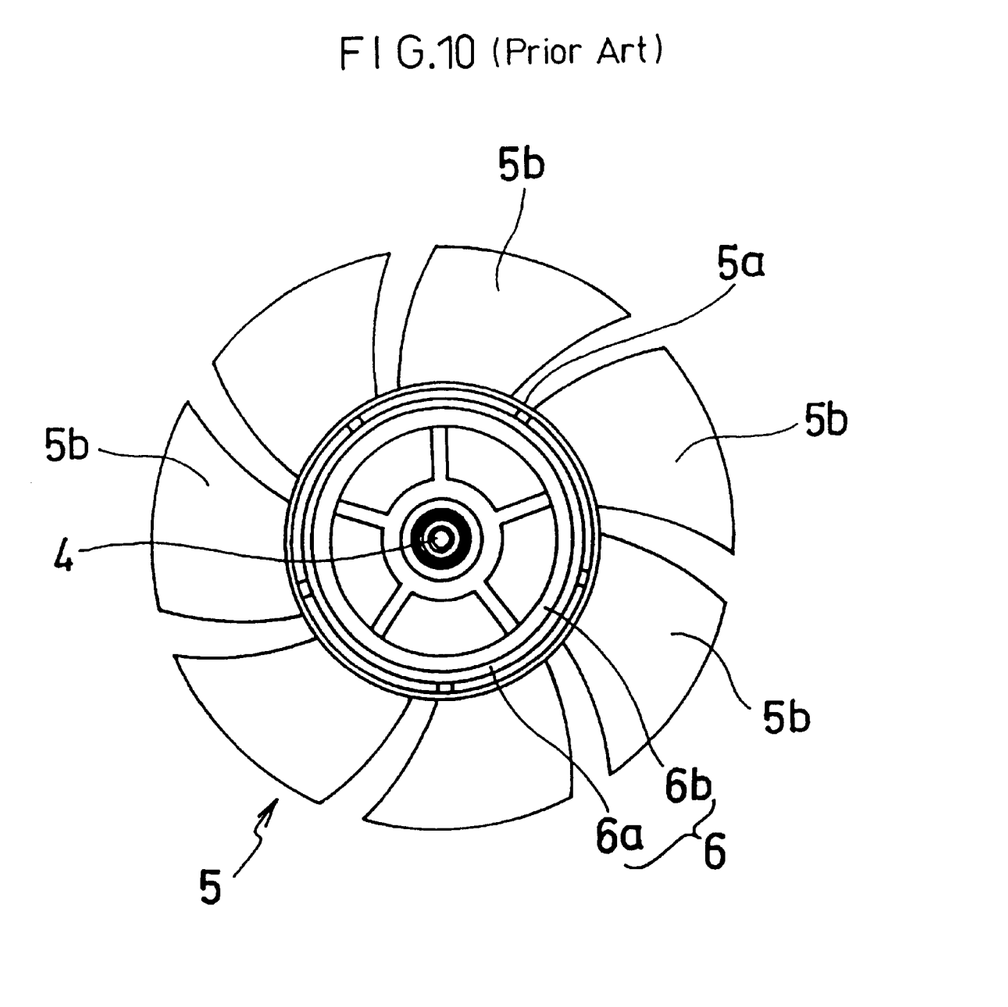
FIG. 10 is a rear view of a rotor portion taken from a conventional axial flow type blower provided with an impeller molded from synthetic resin.
Figure 11:
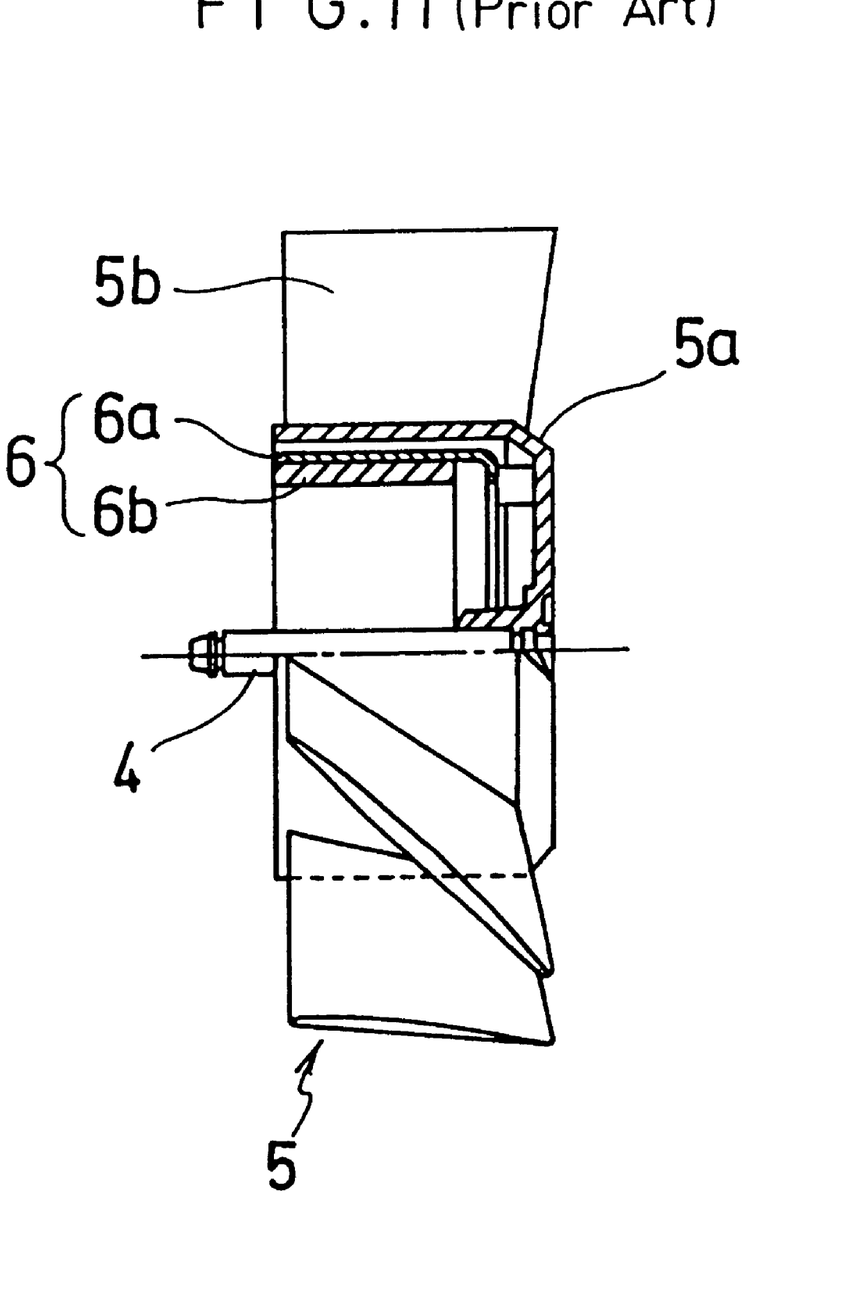
FIG. 11 is a partially sectional, right side view of the rotor portion shown in FIG. 10.

In most cases, the impeller 5 is molded from synthetic resin, and FIGS. 10 and 11 are a rear view and a partially sectional, left side view of a rotor portion, respectively, picked up from an axial flow type blower provided with such impeller 5. In each of figures, components identical to or corresponding to the components shown in FIG. 9 are denoted by the same reference numerals, and the detailed description thereof is omitted.

In a case where the impeller 5 of the axial flow type blower is molded from synthetic resin, metal dies are designed to be axially coupled to each other. For this reason, in view of a molding requirement, blades 5b are disposed at equal angular spacing on the outer periphery of the cup portion 5a so that adjacent two blades 5b and 5b are not overlapped with each other as viewed in the axial direction of the impeller 5 as shown in FIG. 10.

There is a case, however, that the axial flow type blower of this type is required to have an impeller in which adjacent blades 5b and 5b are overlapped with each other as viewed in the axial direction of the impeller 5 in order to, for example, increase a static pressure or the like.

However, with the prior art, such an impeller 5 can not be manufactured from synthetic resin easily and in a cost-effective manner in view of the molding requirement, and a solution on this point was desired.

SUMMARY OF THE INVENTION

The present invention has been made in view of the above problems, and an object thereof is to provide an impeller for an axial flow type blower, which can easily and cost-effectively realize an arrangement in which adjacent blades are overlapped with each other as viewed in the axial direction even if the impeller is molded from synthetic resin.

In order to attain the above-noted object, a first aspect of the present invention is directed to an impeller for an axial flow type blower driven by an outer rotor type motor which is integrated to a rotatably supported shaft and a motor yoke to be rotated about the shaft around an outer side of a stator together with the motor yoke for ventilation, the impeller for an axial flow type blower characterized by comprising divided impellers that are molded from synthetic resin separately from and independently of each other, the divided impellers being disposed in series forming multiple stages in an axial direction of the shaft.

In the first aspect of the present invention, divided impellers are separately molded and the divided impellers are then disposed in series forming multiple stages to thereby constitute the impeller as a whole.

Consequently, each of the divided impeller can be molded while satisfying the molding requirement if adjacent blades are set not to be overlapped with each other as viewed in the axial direction.

If all of the divided impellers are disposed in series as multiple stages in the axial direction of the shaft, an impeller obtained as a whole can be provided with adjacent blades overlapped with each other to function as a single impeller. Further, such an impeller can also be obtained, that has adjacent independent blades not overlapped with each other and that has blades in the front stage and the rear stage. That is, the impeller can serve as an impeller having a plurality of blades that are disposed in the axial direction.

According to a second aspect of the present invention, there is provided an impeller for an axial flow type blower of the first aspect of the present invention, in which, of the plurality of divided impellers adjacent to each other in the axial direction of the shaft on the front and rear sides, a front side divided impeller has back end portions of ventilating surfaces which respectively abut against fore end portions of ventilating surfaces of a rear side divided impeller. With this arrangement, a single ventilating surface is formed by the ventilating surface of the front side divided impeller and the ventilating surface of the rear side divided impeller to have a dimension summed up by these surfaces. The impeller constructed thus serves as the aforementioned impeller in which the adjacent blades are overlapped with each other.

According to a third aspect of the present invention, there is provided an impeller for an axial flow type blower of the first aspect of the present invention, in which, of the plurality of divided impellers adjacent to each other on the axial direction of the shaft on the front and rear sides, a front side divided impeller has back end portions of ventilating surfaces which are respectively offset, about the axis, from fore end portions of ventilating surfaces of a rear side divided impeller. The impeller constructed thus serves as the aforementioned impeller in which the adjacent blades are not overlapped with each other, and the independent blades (ventilating surfaces) are provided on the front and rear sides.

DETAILED DESCRIPTION OF THE PREFERRED EMBODIMENTS

An embodiment of the present invention will be described with reference to the drawings.

In FIGS. 1 to 8, the same reference numerals denote the same components. Further, in FIGS. 1 to 8, components that are identical to or correspond to the components shown in FIGS. 9 to 11 are denoted by the same reference numerals.

Figure 1:
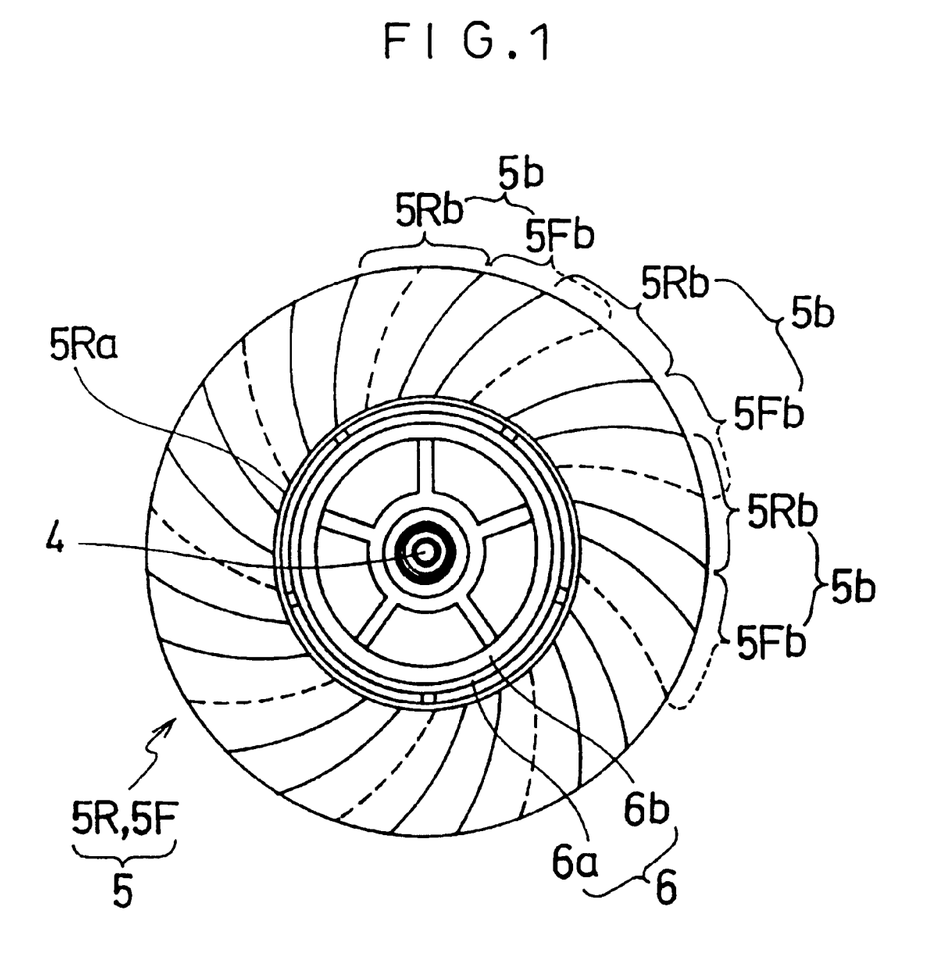
FIG. 1 is a rear view of a rotor portion taken from an axial flow type blower provided with an impeller according to an embodiment of the present invention.
Figure 2:
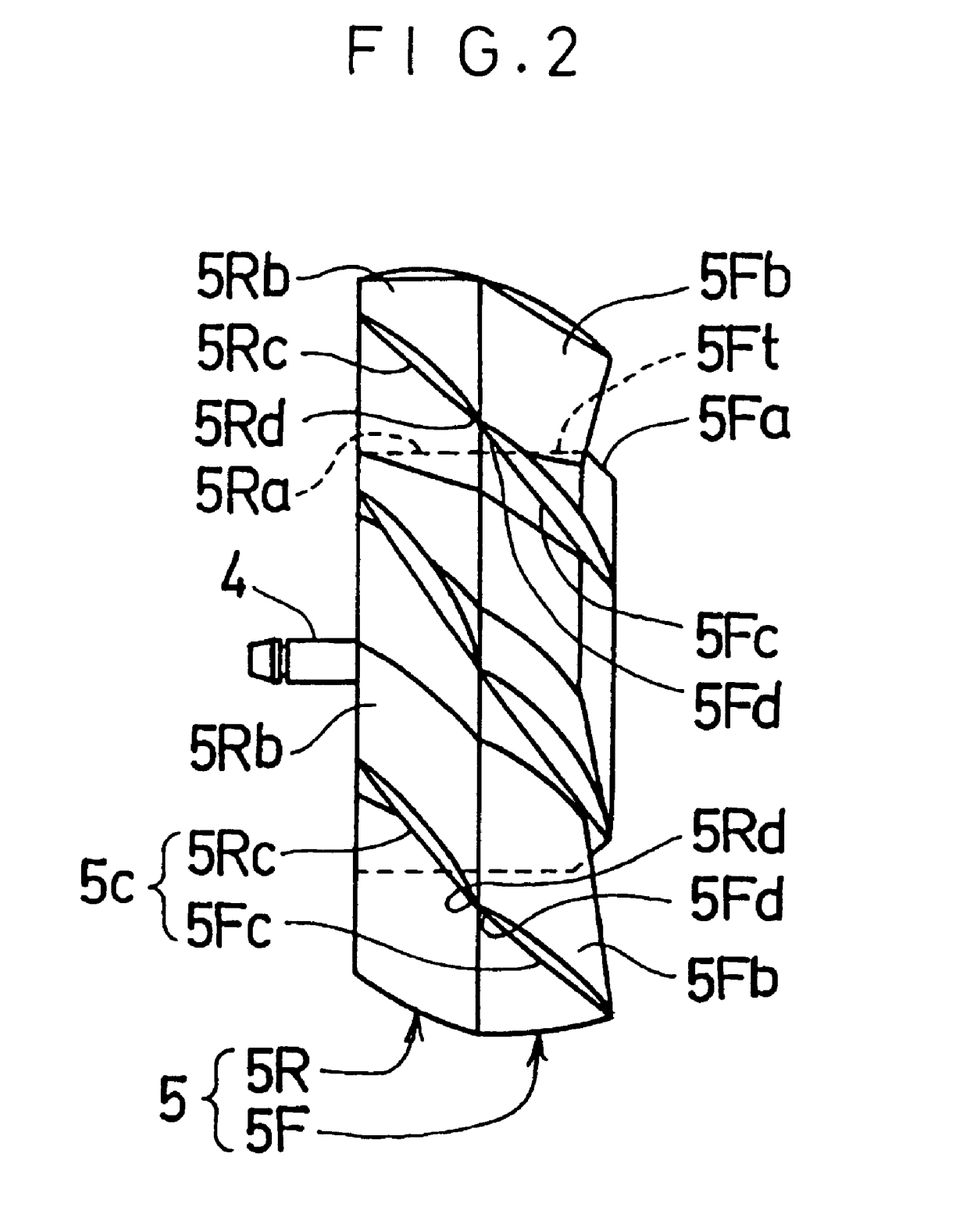
FIG. 2 is a right side view of the rotor portion shown in FIG. 1.

FIG. 1 is a rear view of a rotor portion taken from an axial flow type blower provided with an impeller according to an embodiment of the present invention. FIG. 2 is a right side view of the rotor portion shown in FIG. 1.

As illustrated, the impeller 5 of the present invention is designed such that a plurality of divided impellers (in this embodiment, two divided impellers 5F and 5R) are disposed in series in an axial direction (in a right-and-left direction in FIG. 2) of the shaft 4 as multiple stages.

Figure 3:
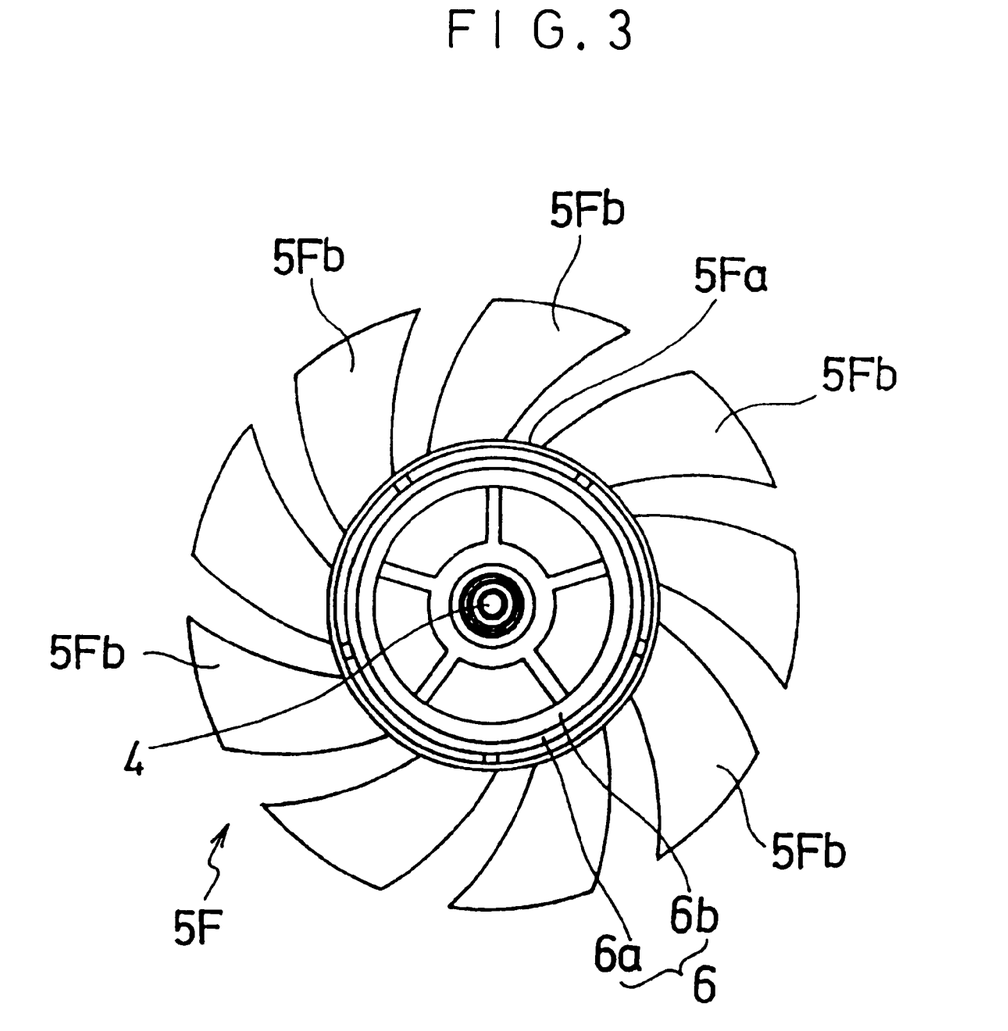
FIG. 3 is a rear view of a front side divided blade in the rotor portion shown in FIG. 1 in a state where the front side divided impeller is not attached.
Figure 4:
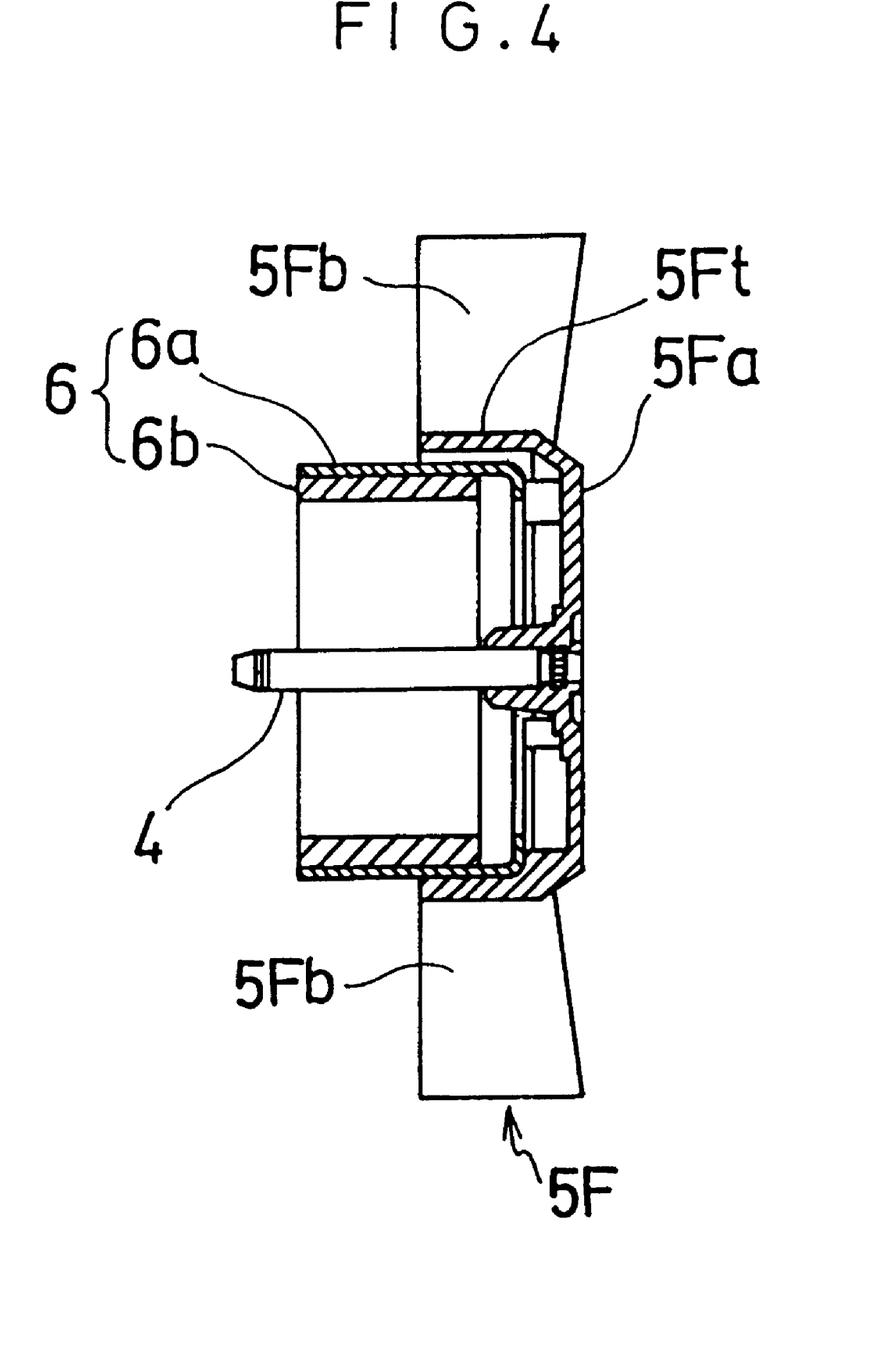
FIG. 4 is a partially sectional, right side view of the front side divided blade shown in FIG. 3.
Figure 5:
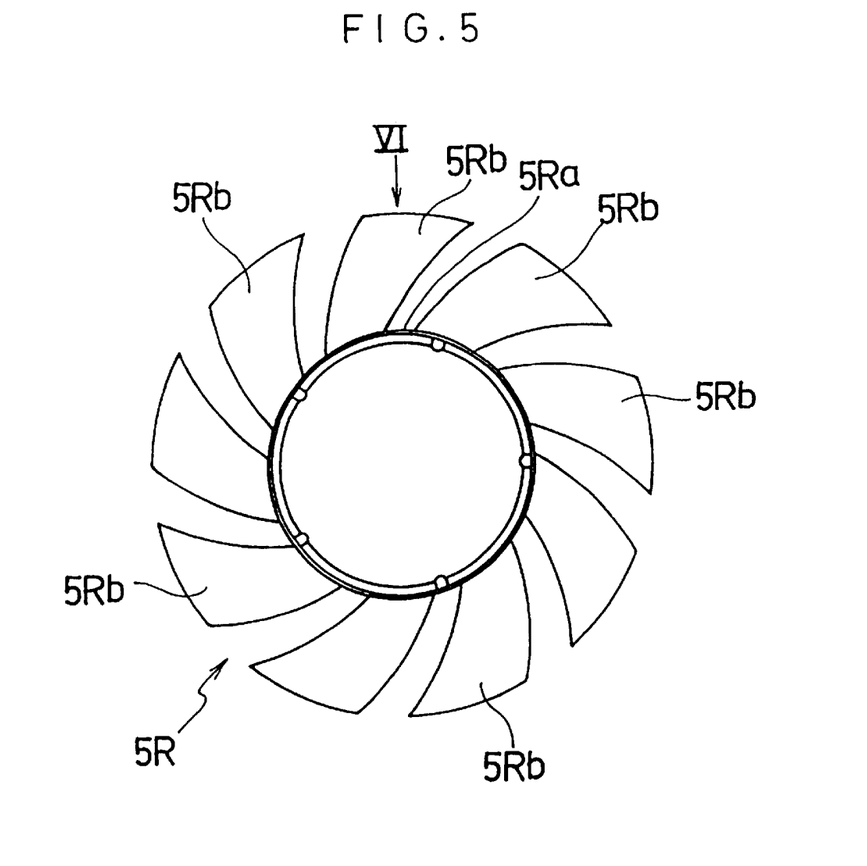
FIG. 5 is a rear view of a rear side divided blade in the rotor portion shown in FIG. 1 in a state where the rear side divided impeller is not attached.
Figure 6:
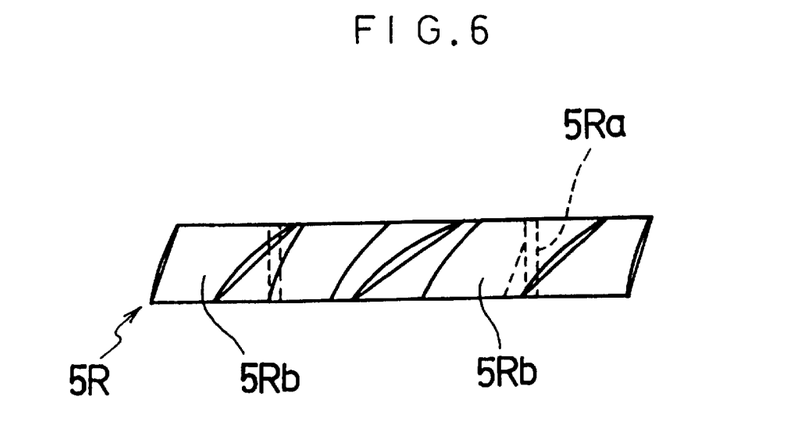
FIG. 6 is a view in an arrow VI direction of FIG. 5.

As shown in FIGS. 3 and 4, a front side divided impeller 5F of the divided impellers includes a cup portion 5Fa which is tubular with a bottom, and a plurality of (nine, in this embodiment) blades 5Fb which are disposed at equal angular spacing on the outer periphery of a tubular portion 5Ft of the cup portion 5Fa. A rear side divided impeller 5R includes, as shown in FIGS. 5 and 6, a tubular portion 5Ra, and a plurality of (nine, in this embodiment) blades 5Rb which is disposed at the equal angular spacing on the outer periphery of the tubular portion 5Ra thereof.

The tubular portion 5Ft of the cup portion 5Fa of the divided impeller 5F is sized to be substantially equal in outer and inner diameters to the tubular portion 5Ra of the divided impeller 5R. Therefore, when the divided impellers 5F and 5R are assembled together to constitute the impeller 5 of the present invention as described later, the tubular portion 5Ft of the cup portion 5Fa and the tubular portion 5Ra are made continuous and flush with each other to cooperatively form a single tubular portion (see FIG. 7).

The divided impellers 5F and 5R are molded from synthetic resin separately from and independently of each other. In this embodiment, adjacent blades 5Fb and 5Fb in the blades 5Fb . . . of the divided impeller 5F are set such that they are not overlapped with each other as viewed in the axial direction of the impeller 5F (see FIG. 3). Similarly, adjacent blades 5Rb and 5Rb in the blades 5Rb . . . of the divided impeller 5R are set such that they are not overlapped with each other as viewed in the axial direction of the impeller 5R (see FIG. 5). Accordingly, each of the divided impellers 5F and 5R can be molded easily and cost-effectively using axially coupled type metal dies.

Further, the divided impellers 5F and 5R are set so that, when each of fore end portions 5Rd of ventilating surfaces 5Rc of the rear side divided impeller 5R abuts against an associated one of back end portions 5Fd of ventilating surfaces 5Fc of the front side divided impeller 5F to constitute a respective ventilating surface 5c by a pair of the ventilating surfaces 5Fc and 5Rc, the adjacent ventilating surfaces 5c and 5c are overlapped with each other as viewed in the axial direction of the divided impellers 5F and 5R.

To constitute the impeller 5 of the present invention, the divided impellers 5F and 5R are assembled together, for example, in the following procedure.

First of all, as shown in FIG. 4, the front side divided impeller 5F, in which the shaft 4 is inserted into and fixed to the central portion of the bottom inner surface of the cup portion 5Fa, is fixed to the front end portion of a substantially tubular motor yoke 6a. Here, by pressure-inserting the front end portion of the motor yoke 6a into the inner peripheral portion of the cup portion 5Fa, the front side divided impeller 5F is fixed to the motor yoke 6a.

Figure 7:
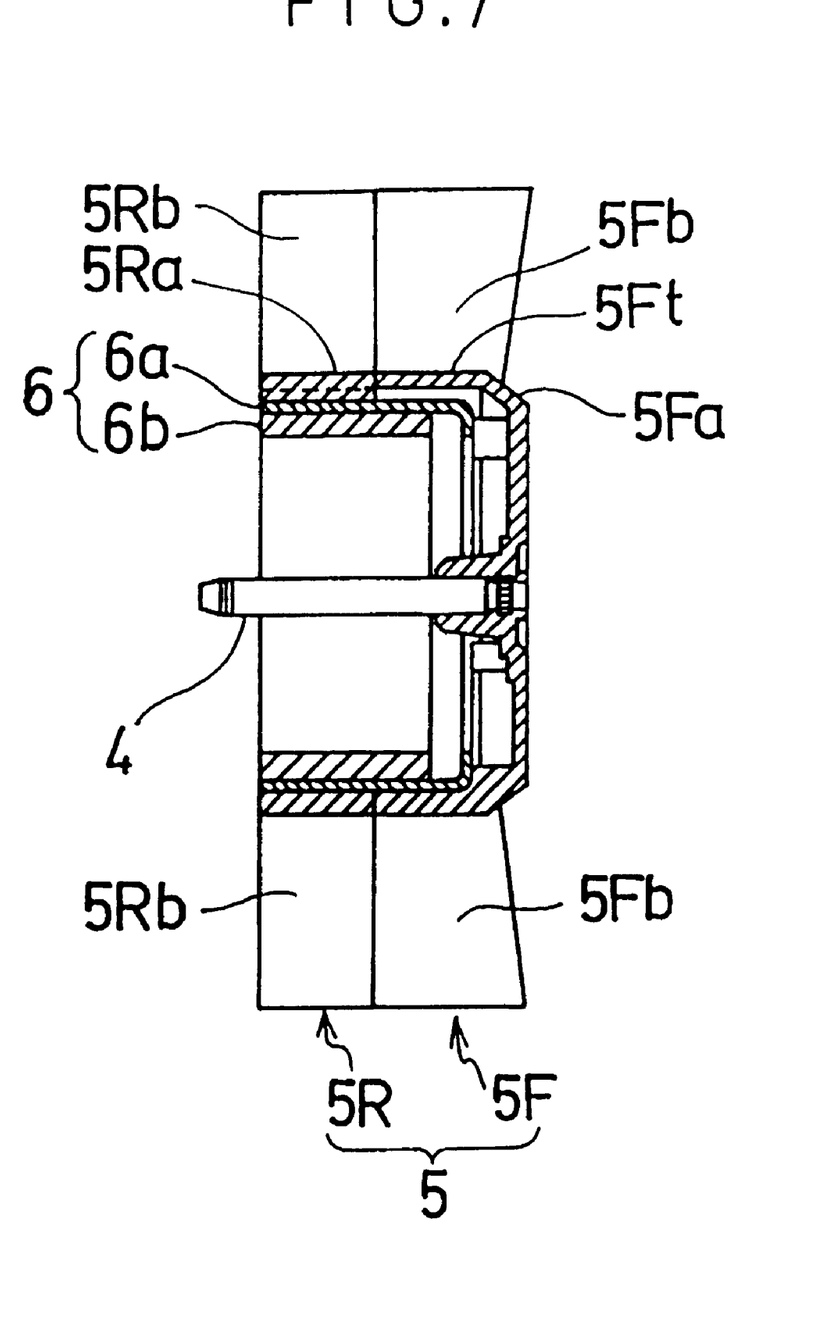
FIG. 7 is a partially sectional, left side view showing an attached state (a complete state) in which the rear side divided impeller shown in FIGS. 5 and 6 is attached to the rotor portion shown in FIGS. 3 and 4.

Then, as shown in FIG. 7, the rear side divided impeller 5R is fixed to the motor yoke 6a by pressure-inserting the tubular portion 5Ra thereof onto the rear side outer periphery of the same motor yoke 6a. In this assembly, the front end (of the cup portion 5Ra) of the rear side divided impeller 5R abuts against the rear end (of the cup portion 5Fa) of the front side divided impeller 5F, so that the tubular portion 5Ft of the cup portion 5Fa and the tubular portion 5Ra are made continuous and flush with each other to form a single tubular portion.

In this assembly, as shown in FIG. 2, the angular relation between the front side impeller 5F and the rear side impeller 5R about their axis is adjusted so that the fore end portions 5Rd of the ventilating surfaces 5Rc of the rear side divided impeller 5R abut respectively against the back end portion 5Fd of the ventilating surfaces 5Fc of the front side divided impeller 5F. With this arrangement, the single ventilating surface 5c is formed by the ventilating surface 5Fc of the front side divided impeller 5F and the mating ventilating surface 5Rc of the rear side impeller 5R.

The adjacent ventilating surfaces 5c and 5c (the adjacent pairs of the ventilating surfaces 5Fc, 5Rc abutting together) are partially overlapped with each other as viewed in the axial direction of the divided impellers 5F and 5R. This arrangement can increase the static pressure of the axial flow type blower in cooperation with the arrangement in which the single ventilating surface 5c is formed by the pair of the ventilating surfaces 5Fc and 5Rc.

In addition, a ring-like permanent magnet 6b which constitutes a major component of the rotor (outer rotor) in cooperation with the motor yoke 6a, is fixed to the inner periphery of the motor yoke 6a (see FIGS. 1, 3, 4 and 7).

Figure 8:
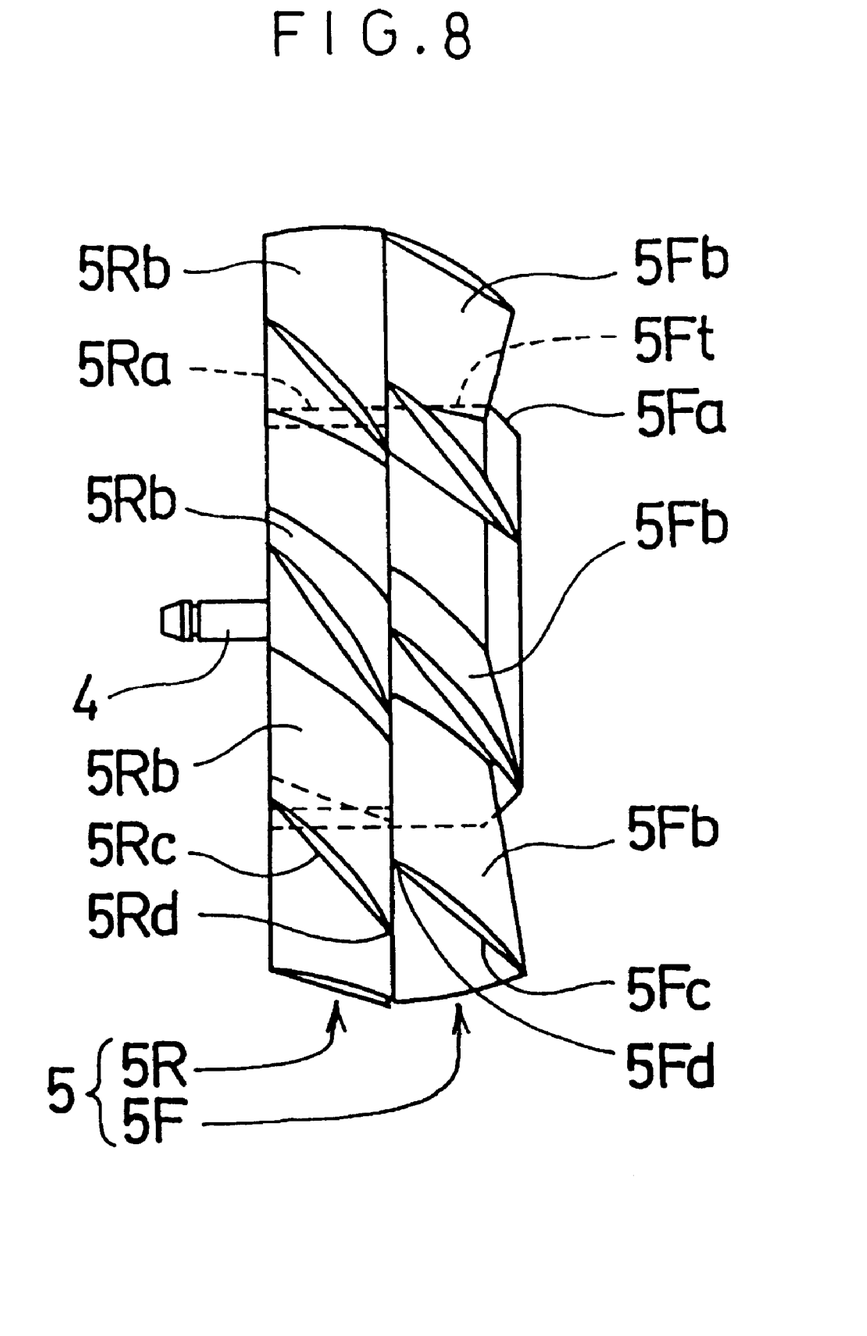
FIG. 8 is a left side view showing a rotor portion taken from an axial flow type blower provided with an impeller according to another embodiment of the present invention.

Although, in the embodiment described above, the fore end portions 5Rd of the ventilating surfaces 5Rc of the rear side dividing impeller 5R abut against the back end portion 5Fd of the ventilating surfaces 5Fc of the front side dividing impeller 5F as shown in FIG. 2, these end portions 5Rd and 5Fd may be positioned to be offset about the axial direction without abutting each other, as shown in FIG. 8. With this arrangement, since the ventilating surfaces 5Rc and 5Fc adjacent in the front-to-rear direction function independently, it is possible to increase the volume of air flow and set the blowing-out direction of the air.

In each of the embodiments, if a short shaft 4 is inserted and fixed to the front side divided impeller 5F, then the impeller can be used as an impeller of a thin, axial flow type blower.

As described above, according to the present invention, an impeller is divided into divided impellers that are to be disposed in series to construct the entire impeller. Therefore, a remarkable effect is obtained, in which various modifications can be applied with respect to ventilating surfaces by suitably setting relative angular positions of ventilating surfaces of multistage divided impellers when a plurality of divided impellers independently molded are disposed in series in an assembly procedure.

More specifically, it is possible to easily and cost-effectively realize an impeller arrangement in which adjacent blades (ventilating surfaces) are overlapped with each other as viewed in the axial direction even in a synthetic-resin-molded product. Further, it is also possible to easily construct an impeller having multistaged, independent blades in which adjacent blades are not overlapped with each other, thereby making it possible to easily increase the volume of air flow, set the blowing-out direction of the air, etc.

What is claimed is:

1. An impeller for an axial flow type blower driven by an outer rotor type motor which is integrated to a rotatably supported shaft and a motor yoke to be rotated about the shaft around an outer side of a stator together with the motor yoke for ventilation, characterized in that the impeller for the axial flow type blower comprises:

divided impellers that are molded from synthetic resin separately from and independently of each other, the divided impellers being disposed in series forming multiple stages in an axial direction of the shaft.

2. The impeller for the axial flow type blower according to claim 1, wherein, of the plurality of divided impellers adjacent to each other in the axial direction of the shaft on the front and rear sides, a front side divided impeller has back end portions of ventilating surfaces which respectively abut against fore end portions of ventilating surfaces of a rear side divided impeller.

3. The impeller for the axial flow type blower according to claim 1, wherein, of the plurality of divided impellers adjacent to each other in the axial direction of the shaft on the front and rear sides, a front side divided impeller has back end portions of ventilating surfaces which are respectively offset, about the axis, from fore end portions of ventilating surfaces of a rear side divided impeller.

* * * * *